United States Patent
Murase

(10) Patent No.: US 10,124,677 B2
(45) Date of Patent: Nov. 13, 2018

(54) REGENERATION CONTROL DEVICE FOR VEHICLE

(71) Applicant: Mitsubishi Jidosha Kogyo Kabushiki Kaisha, Tokyo (JP)

(72) Inventor: Masahiro Murase, Kariya (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 155 days.

(21) Appl. No.: 15/208,098

(22) Filed: Jul. 12, 2016

(65) Prior Publication Data

US 2017/0021729 A1   Jan. 26, 2017

(30) Foreign Application Priority Data

Jul. 24, 2015 (JP) .................. 2015-146813

(51) Int. Cl.
*B60L 7/18* (2006.01)
*B60L 7/10* (2006.01)
*B60L 3/00* (2006.01)
*B60L 7/14* (2006.01)
*B60L 15/20* (2006.01)

(52) U.S. Cl.
CPC ............... *B60L 7/18* (2013.01); *B60L 3/0015* (2013.01); *B60L 7/10* (2013.01); *B60L 7/14* (2013.01); *B60L 15/2009* (2013.01); *B60L 15/2045* (2013.01); *B60L 2250/24* (2013.01); *Y02T 10/7005* (2013.01); *Y02T 10/7275* (2013.01)

(58) Field of Classification Search
None
See application file for complete search history.

(56) References Cited

U.S. PATENT DOCUMENTS

| 6,232,729 | B1 | 5/2001 | Inoue | |
| 2007/0228821 | A1* | 10/2007 | Maki | B60L 7/10 303/151 |

(Continued)

FOREIGN PATENT DOCUMENTS

| JP | 8-79907 A | 3/1996 |
| JP | 2005-168283 A | 6/2005 |

OTHER PUBLICATIONS

Extended European Search Report dated Nov. 18, 2016 issued in corresponding EP Application No. 16 18 0402.

*Primary Examiner* — David P. Merlino
(74) *Attorney, Agent, or Firm* — Birch, Stewart, Kolasch & Birch, LLP

(57) ABSTRACT

A regeneration control device for a vehicle includes: a motor control unit that drives a motor generator connected to running wheels of the vehicle at the time of decreasing a vehicle speed, so as to generate electricity, performing regenerative braking; a paddle switch that performs increasing/decreasing operation on a regeneration amount Tr by the motor generator; and a main control unit that performs increasing/decreasing control on the regeneration amount Tr continuously in response to the increasing/decreasing operation by the paddle switch, wherein the main control unit sets a regeneration amount increasing rate in an increasing operation of the regeneration amount by operation of an UP switch of the paddle switch to be higher than a regeneration amount decreasing rate in a decreasing operation of the regeneration amount by operation of a DOWN switch.

16 Claims, 4 Drawing Sheets

(56) References Cited

U.S. PATENT DOCUMENTS

| | | | | |
|---|---|---|---|---|
| 2010/0076657 A1* | 3/2010 | Jinno | ............... | B60L 7/14 |
| | | | | 701/70 |
| 2012/0038208 A1* | 2/2012 | Matsushita | ......... | B60L 15/2009 |
| | | | | 303/3 |
| 2012/0098502 A1 | 4/2012 | Hori | | |
| 2014/0379190 A1* | 12/2014 | Sawada | ............... | B60L 7/14 |
| | | | | 701/22 |
| 2015/0006039 A1* | 1/2015 | Hyun | ............... | B60W 10/192 |
| | | | | 701/48 |
| 2015/0019058 A1* | 1/2015 | Georgiev | ............... | B60L 7/14 |
| | | | | 701/22 |
| 2015/0069938 A1* | 3/2015 | Hisano | ............... | B60L 7/14 |
| | | | | 318/377 |
| 2015/0274020 A1* | 10/2015 | Matsuda | ............... | B60L 7/18 |
| | | | | 701/70 |
| 2016/0368384 A1* | 12/2016 | Johansson | ............... | B60L 7/18 |

\* cited by examiner

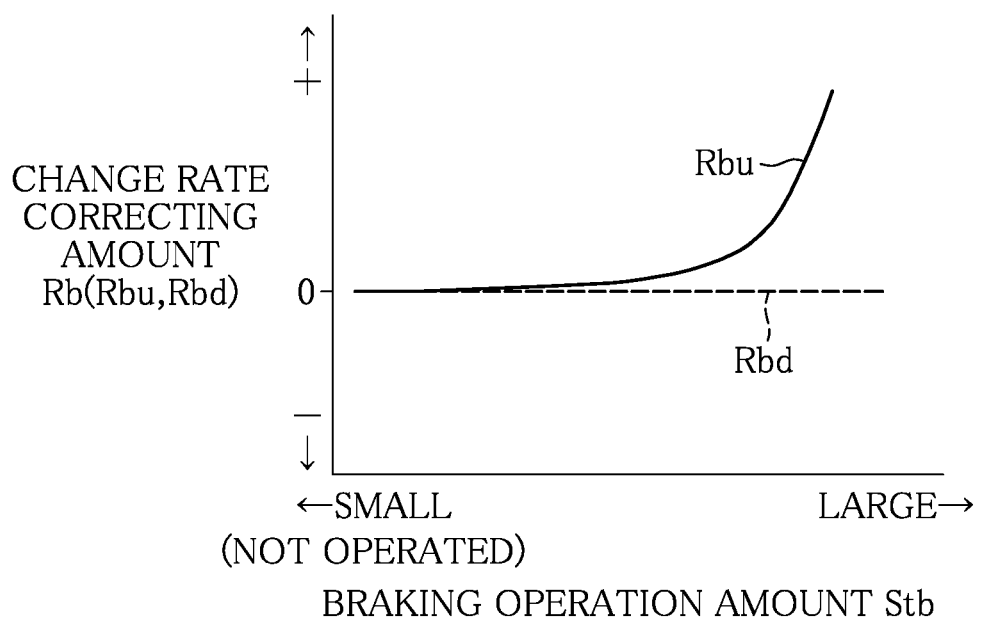

REGENERATION CONTROL DEVICE FOR VEHICLE

BACKGROUND OF THE INVENTION

Field of the Invention

The present invention relates to a regeneration control device for a vehicle capable of performing an adjustment operation of a regeneration amount.

Description of the Related Art

As conventionally practiced, in a vehicle that includes a motor for running drive, such as an electric vehicle and a hybrid vehicle, a regenerative braking device is included. The regenerative braking device converts kinetic energy into electrical energy using the motor as an electric generator to charge a battery in the vehicle, in decelerating, running downhill, or other situation of the vehicle.

Some types of regenerative braking devices control regeneration amount (regenerative load) by motor. The regeneration amount is controlled based on, for example, the depressing amount of a brake pedal.

Japanese Patent Laid-Open No. 2005-168283 discloses a vehicle including an operation device that allows a driver to set a regeneration amount. This operation device is capable of, for example, switching a regeneration amount by operating a mode switch, or continuously adjusting the regeneration amount with a slide switch provided in the vicinity of a shift lever. In addition, development is in progress on a vehicle in which a regeneration amount can be switched stepwise by operating a paddle switch that is provided on a steering wheel.

However, for the vehicle described above capable of switching the regeneration amount stepwise, it is difficult for the vehicle to be decelerated smoothly. Furthermore, when the regeneration amount is intended to be changed immediately by a large amount, the operation device for switching the regeneration amount needs to be operated many times, which will be a troublesome operation.

Also for the vehicle disclosed in Patent Literature 1 that allows a regeneration amount to be adjusted and set continuously, it is difficult to balance both changing the regeneration amount immediately by a large amount and setting the regeneration amount minutely.

SUMMARY OF THE INVENTION

Thus, an objective of the present invention is to provide a regeneration control device for a vehicle that is capable of adjusting appropriately a regeneration amount in accordance with the status of the vehicle.

In order to achieve the above objective, a regeneration control device for a vehicle according to the present invention is a regeneration control device for a vehicle including: a regenerative braking device that performs regenerative braking on a revolving armature for transmitting driving force to running wheels of the vehicle at the time of decreasing a vehicle speed, so as to generate electricity; a regeneration amount increasing/decreasing operator that performs increasing/decreasing operation on a regeneration amount in the regenerative braking device; and a regeneration amount controller that performs increasing/decreasing control on the regeneration amount continuously in response to the increasing/decreasing operation using the regeneration amount increasing/decreasing operator. The regeneration amount controller sets a change rate for the regeneration amount in an increasing operation of the regeneration amount using the regeneration amount increasing/decreasing operator to be higher than a change rate for the regeneration amount in a decreasing operation of the regeneration amount.

This configures the regeneration control device for a vehicle according to the present invention such that the change rate for the regeneration amount in an increasing operation of the regeneration amount is set to be higher than the change rate for the regeneration amount in a decreasing operation of the regeneration amount. Thus, it is possible to rapidly increase a regeneration amount by an increasing operation of the regeneration amount. The increasing operation of the regeneration amount is often performed when a driver wants a rapid deceleration, for example, in the case where a signal forward of the driver turns to red, and the driver wants to rapidly decelerate a vehicle with regeneration force, or in the case where the driver avoids a collision. Therefore, the increasing operation of the regeneration amount is suitable for such an intention of a driver.

In addition, when the regeneration amount is decreased, it is not often the case where the regeneration amount is rapidly decreased, and in many cases, the operation is performed to adjust the regeneration amount to a desired value. Therefore, it is possible to accurately set the regeneration amount to the desired value by setting the decreasing rate for the regeneration amount small in the decreasing operation of the regeneration amount. In such a manner, the increasing/decreasing operation of the regeneration amount using the regeneration amount increasing/decreasing operator serves the purpose thereof and is excellent in usability.

BRIEF DESCRIPTION OF THE DRAWINGS

The present invention will become more fully understood from the detailed description given hereinafter and the accompanying drawings which are given by way of illustration only, and thus, are not limitative of the present invention, and wherein:

FIG. 5 is a map for setting a change rate correcting amount for the regeneration amount based on a brake stroke.

DETAILED DESCRIPTION OF THE INVENTION

Hereinafter, an embodiment of the present invention will be described with reference to the accompanying drawings.

Figure 1:
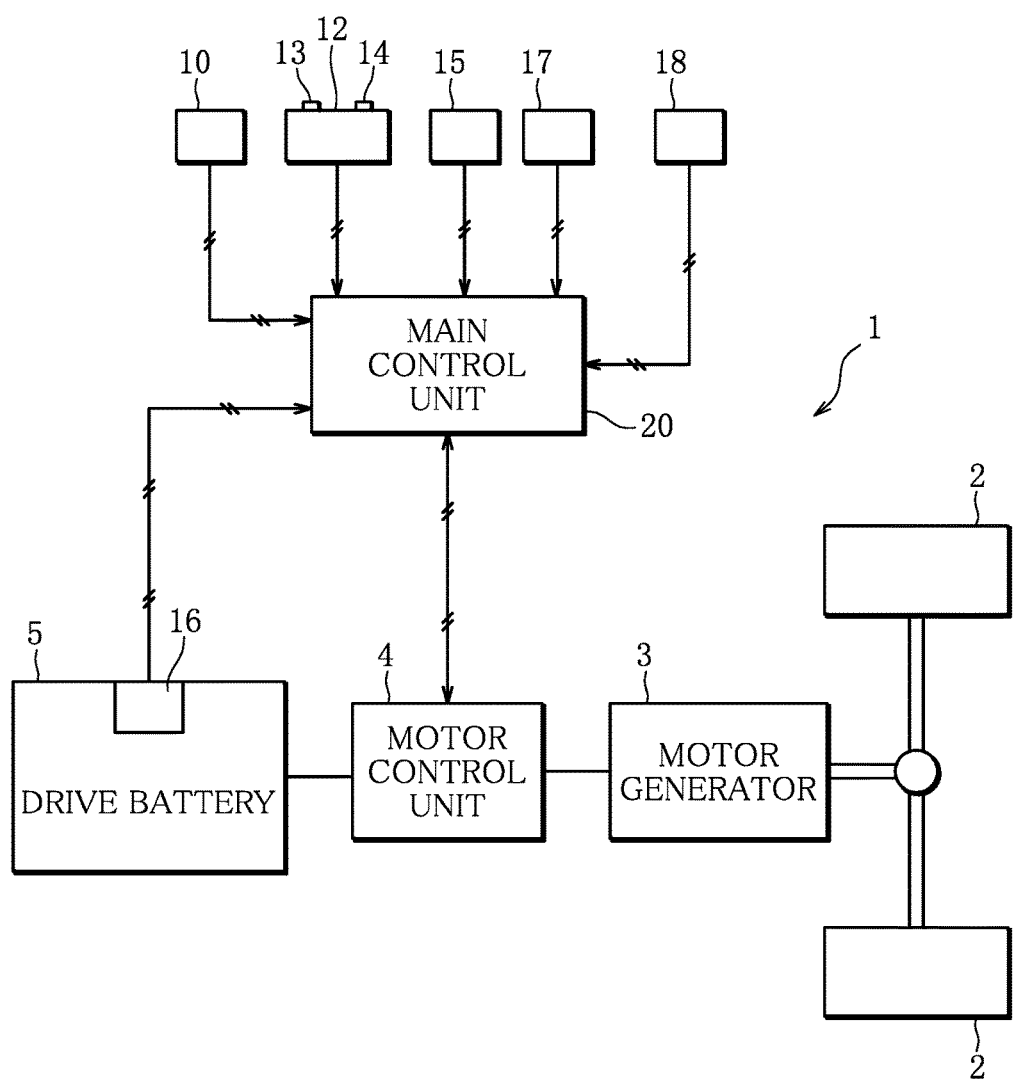
FIG. 1 is a schematic configuration diagram of a regeneration control device for a vehicle according to an embodiment of the present invention.

FIG. 1 is a configuration diagram of a regeneration control device for a vehicle according to an embodiment of the present invention. The configuration of a regeneration control device 1 will be described below with reference to this drawing.

As illustrated in FIG. 1, the regeneration control device 1 in the present embodiment is mounted in a vehicle such as an electric vehicle, a hybrid vehicle, and a plug-in hybrid vehicle that drives running wheels 2 with a motor generator 3 (revolving armature).

The motor generator 3 is driven under the control by a motor control unit 4, being supplied with electricity by a drive battery 5 (energy storage) mounted in the vehicle. In addition, the motor generator 3 has a function as an electric generator at the time of decreasing a vehicle speed. The electricity generated by the motor generator 3 at the time of decreasing a vehicle speed is used in onboard equipment and the other equipment (not illustrated), and the surplus electricity is charged to the drive battery 5.

The motor control unit 4 has a function of controlling the output torque of the motor generator 3 when the vehicle runs, as well as a function of controlling the amount of electricity generated by the motor generator 3 at the time of decreasing a vehicle speed so as to control a regenerative brake torque (regeneration amount). The motor generator 3 and the motor control unit 4 are equivalent to the regenerative braking device of the present invention.

The vehicle is provided with a shift switch 10 for switching a running mode. As the running mode, there are a drive mode (D) in which the vehicle is in normal running, a neutral mode (N) in which power transmission between the motor generator 3 and the running wheels 2 is cut off, a reverse mode (R) in which the vehicle runs backward, a brake mode (B) in which a given braking force is greater than in the drive mode, and an economy mode (E) in which a given braking force is greater than in the drive mode and less than in the brake mode.

The vehicle is further provided with, on its steering wheel, a paddle switch 12 (regeneration amount increasing/decreasing operator). The paddle switch 12 is provided with an UP switch 13 for increasing the regeneration amount, and a DOWN switch 14 for decreasing the regeneration amount. The UP switch 13 and the DOWN switch 14 are momentary switches.

The vehicle is further provided with a vehicle speed sensor 15 (vehicle speed detector) for detecting the vehicle speed (running speed), a charging rate detector 16 for detecting the charging rate of the drive battery 5, a brake pedal sensor 17 (braking operation detector, braking amount detector) for detecting the depressing amount of a brake pedal in a hydraulic braking device of the vehicle, and a gas pedal sensor 18 for detecting the depressing amount of a gas pedal.

A main control unit 20 (regeneration amount controller) includes an input/output device, a storage device (e.g., ROM, RAM, nonvolatile RAM), a central processing device (CPU), a timer, and the other devices. The main control unit 20 receives detection information and operation information from the shift switch 10, a paddle switch 12, a vehicle speed sensor 15, a charging rate detector 16, a brake pedal sensor 17, and a gas pedal sensor 18, outputs a control signal to the motor control unit 4, controls via the motor control unit 4 the output of the motor generator 3 in vehicle running, and controls a regeneration amount Tr in deceleration running. This regeneration amount Tr in the deceleration running is continuously changed in accordance with an operation time period during which ON operation is performed on one of the UP switch 13 and the DOWN switch 14 of the paddle switch 12.

At the time of turning on the power of the vehicle, the main control unit 20 sets the amount of change in the regeneration amount Tr with respect to the operation time period of the paddle switch 12 (hereafter, referred to as a regeneration amount change rate R) to a reference value that is determined in advance. As the regeneration amount change rate R, the present embodiment has two values: a regeneration amount increasing rate Ru applied when the UP switch 13 is operated, and a regeneration amount decreasing rate Rd applied when the DOWN switch 14 is operated. The regeneration amount increasing rate Ru is set to be higher than the regeneration amount decreasing rate Rd.

Figure 2:
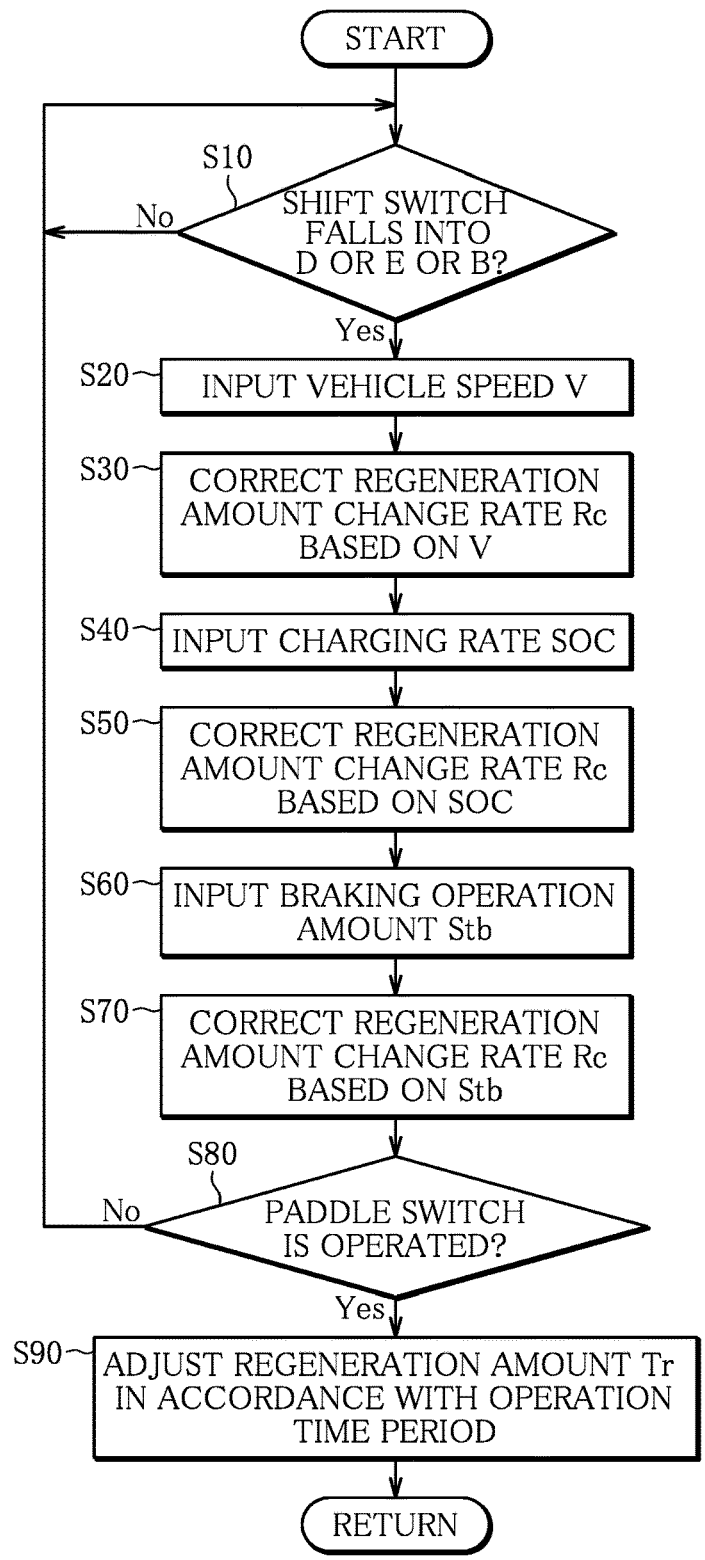
FIG. 2 is a flowchart illustrating the scheme of regeneration control.
Figure 3:
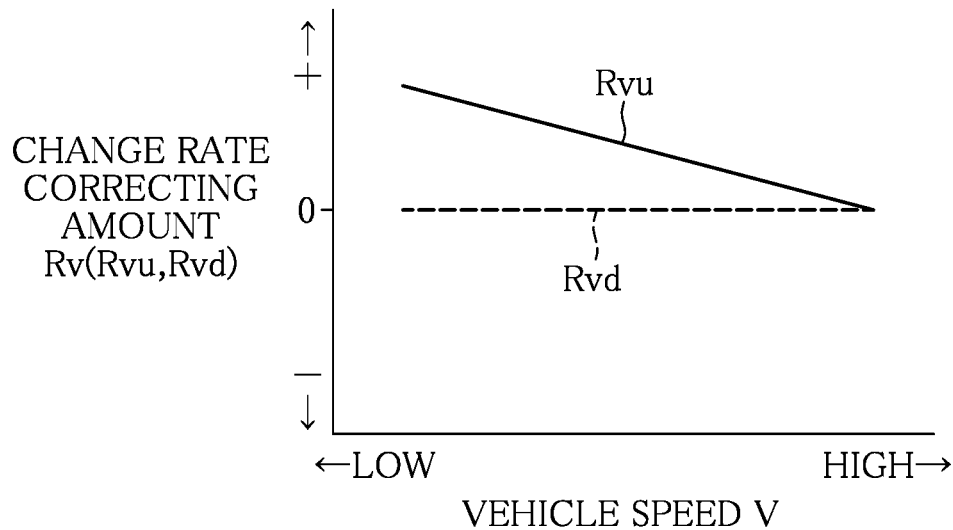
FIG. 3 is a map used for setting a change rate correcting amount for a regeneration amount based on a vehicle speed.
Figure 4:
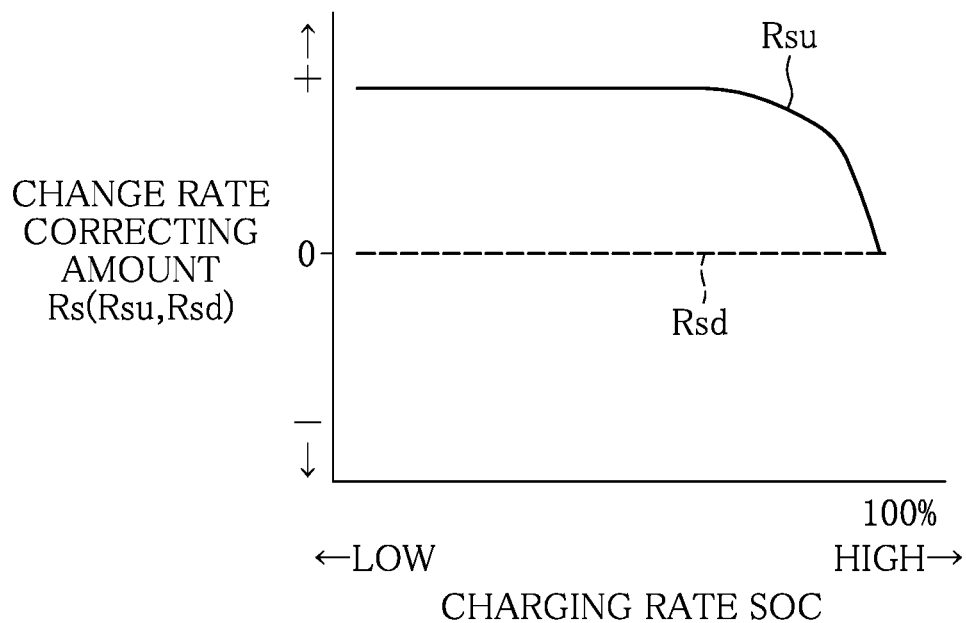
FIG. 4 is a map used for setting a change rate correcting amount for the regeneration amount based on a charging rate.

FIG. 2 is a flowchart illustrating the scheme of regeneration control performed in the main control unit 20. FIG. 3 is a map used for setting a change rate correcting amount Rv for the regeneration amount Tr based on a vehicle speed V. FIG. 4 is a map for setting a change rate correcting amount Rs for the regeneration amount Tr based on a charging rate SOC. FIG. 5 is a map for setting a change rate correcting amount Rb for the regeneration amount Tr based on a braking operation amount Stb. In each of FIGS. 3 to 5, a solid line represents a change rate correcting amount on a regeneration amount increase side when the UP switch 13 is pressed, and a broken line represents a change rate correcting amount on a regeneration amount decrease side when the DOWN switch 14 is pressed.

This routine is executed in the main control unit 20, it is repeatedly performed during the power of the vehicle is turned on.

First, in step S10, a current shift mode selected with the shift switch 10 is input. It is determined whether or not the shift mode falls into one of the drive mode, the economy mode, and the brake mode. When the shift mode falls into one of the drive mode, the economy mode, and the brake mode, that is, when the vehicle is in a running state, the routine proceeds to step S20. When the shift mode does not fall into any one of the drive mode, the economy mode, and the brake mode, the routine returns to step S10.

In step S20, the vehicle speed V is input from vehicle speed sensor 15. Then, the routine proceeds to step S30.

In step S30, the regeneration amount change rate R is corrected based on the vehicle speed V that has been input in step S20. The regeneration amount change rate R is corrected in accordance with the change rate correcting amount Rv that is read, for example, from the map illustrated in FIG. 3 based on the vehicle speed V. At this point, when the UP switch 13 is operated, a change rate correcting amount Rvu is read as the change rate correcting amount Rv, or when the DOWN switch 14 is operated, a change rate correcting amount Rvd is read as the change rate correcting amount Rv. Then, the change rate correcting amount Rv is added to the regeneration amount change rate R that is currently set, and the regeneration amount change rate R is overwritten with the resultant value. Specifically, the change rate correcting amount Rvu is added to the regeneration amount increasing rate Ru, and the regeneration amount increasing rate Ru is overwritten with the resultant value. The change rate correcting amount Rvd is added to the regeneration amount decreasing rate Rd, and the regeneration amount decreasing rate Rd is overwritten with the resultant value. As illustrated in FIG. 3, the change rate correcting amount Rvu used when the UP switch 13 is operated is set to be higher than the change rate correcting amount Rvd used when the DOWN switch 14 is operated. In addition, when the UP switch 13 is operated, the change rate correcting amount Rvu is set so as to increase as the vehicle speed V decreases. Then, the routine proceeds to step S40.

In step S40, the charging rate SOC of the drive battery 5 is input from the charging rate detector. Then, the routine proceeds to step S50.

In step S50, the regeneration amount change rate R is corrected based on the charging rate SOC that has been input in step S40. The regeneration amount change rate R is corrected in accordance with the change rate correcting amount Rs that is read, for example, from the map illustrated in FIG. 4 based on the charging rate SOC. At this point, when the UP switch 13 is operated, a change rate correcting amount Rsu is read as the change rate correcting amount Rs, or when the DOWN switch 14 is operated, a change rate correcting amount Rsd is read as the change rate correcting amount Rs. Then, the change rate correcting amount Rs is added to the regeneration amount change rate R that is currently set, and the regeneration amount change rate R is overwritten with the resultant value. Specifically, the change rate correcting amount Rsu is added to the regeneration amount increasing rate Ru, and the regeneration amount increasing rate Ru is overwritten with the resultant value. The change rate correcting amount Rsd is added to the regeneration amount decreasing rate Rd, and the regeneration amount decreasing rate Rd is overwritten with the resultant value. As illustrated in FIG. 4, the change rate correcting amount Rsu used when the UP switch 13 is operated is set to be higher than the change rate correcting amount Rsd used when the DOWN switch 14 is operated. In addition, when the UP switch 13 is operated, the change rate correcting amount Rsu is set so as to decrease as the charging rate SOC increases at about 100 percent. Then, the routine proceeds to step S60.

In step S60, the braking operation amount Stb is input from the brake pedal sensor 17. Then, the routine proceeds to step S70.

In step S70, the regeneration amount change rate R is corrected based on the braking operation amount Stb that has been input in step S60. The regeneration amount change rate R is corrected in accordance with the change rate correcting amount Rb that is read, for example, from the map illustrated in FIG. 5 based on the braking operation amount Stb. At this point, when the UP switch 13 is operated, a change rate correcting amount Rbu is read as the change rate correcting amount Rb, or when the DOWN switch 14 is operated, a change rate correcting amount Rbd is read as the change rate correcting amount Rb. Then, the change rate correcting amount Rb is added to the regeneration amount change rate R that is currently set, and the regeneration amount change rate R is overwritten with the resultant value. Specifically, the change rate correcting amount Rbu is added to the regeneration amount increasing rate Ru, and the regeneration amount increasing rate Ru is overwritten with the resultant value. The change rate correcting amount Rbd is added to the regeneration amount decreasing rate Rd, and the regeneration amount decreasing rate Rd is overwritten with the resultant value. As illustrated in FIG. 5, the change rate correcting amount Rbu used when the UP switch 13 is operated is set to be higher than the change rate correcting amount Rbd used when the DOWN switch 14 is operated. In addition, when the UP switch 13 is operated, the change rate correcting amount Rbu is set so as to increase by a large amount as the braking operation amount Stb increases at a position close to a maximum pedal operation position. Then, the routine proceeds to step S80.

In step S80, it is determined whether or not the paddle switch 12 is operated. When the paddle switch 12 is operated, the routine proceeds to step S90. When the paddle switch 12 is not operated, the routine returns to step S10.

In step S90, the regeneration amount Tr is changed in accordance with the operation of the paddle switch 12. Specifically, when the UP switch of the paddle switch is operated, the regeneration amount Tr is increased, or when the DOWN switch of the paddle switch is operated, the regeneration amount Tr is decreased. At this point, the regeneration amount Tr is changed continuously, and the regeneration amount change rate, namely the amount of change in the regeneration amount Tr with respect to an operation time period of the paddle switch 12 is set to the regeneration amount change rate R that is currently set. Then, this routine is returned.

As seen from the above, in the present embodiment, it is possible to change the regeneration amount Tr continuously toward the increase side and the decrease side in accordance with the operation of the paddle switch 12. Then, the change rate therefor, that is, the regeneration amount change rate R is set to be higher when the UP switch 13 of the paddle switch 12 is operated than when the DOWN switch 14 is operated. This allows the regeneration amount Tr to be quickly increased by the operation of the UP switch 13. On the other hand, the regeneration amount decreasing rate Rd used when the DOWN switch 14 is operated is set to be lower than the regeneration amount increasing rate Ru used when the UP switch 13 is operated. This allows the regeneration amount Tr to be gently decreased by the operation of the DOWN switch 14.

The operation of the UP switch 13 is often performed by a driver in order to rapidly increase the regeneration amount Tr, namely the regenerative brake torque, in the case where, for example, the driver avoids a collision. Therefore, by imparting to the regeneration amount Tr a property of being rapidly increased when the UP switch 13 is operated, the operation is made suitable for such an intention of the driver. In addition, it is not often the case where a driver operates the DOWN switch 14 so as to rapidly decrease the regeneration amount Tr, and in many cases, the decrease is performed to adjust the regenerative brake torque to a desired value. Therefore, by imparting to the regeneration amount Tr a property of being gently decreased when the DOWN switch 14 is operated, it is possible to set a regenerative brake torque to a desired value readily and accurately. This makes the increasing/decreasing operation of the regeneration amount Tr with the paddle switch 12 suitable for their purpose, improving the usability.

In particular, when the UP switch 13 is operated, the change rate correcting amount Rbu is made higher in braking operation than not in braking operation, and thus the regeneration amount Tr is quickly increased by the operation of the UP switch 13. This allows regenerative braking force to be rapidly increased, improving collision avoidance performance.

Furthermore, when the UP switch 13 is operated, the change rate correcting amount Rbu increases as the braking operation amount Stb increases, and the regeneration amount increasing rate Ru increases. Therefore, it is possible to make the regenerative braking force quickly increase by the operation of the UP switch 13 as the braking operation amount Stb increases to cause hard braking of the vehicle, enabling further improvement of the collision avoidance performance.

In addition, when the UP switch 13 is operated, the change rate correcting amount Rvu increases as the vehicle speed V decreases, and the regeneration amount increasing rate Ru increases. In such a manner, when the operation of the UP switch 13 is performed, there is a high possibility that a driver intends a further rapid deceleration or a sudden stop even at a low vehicle speed. Therefore, increasing the regeneration amount increasing rate Ru makes the operation suitable for such an intention.

In addition, when the UP switch 13 is operated, the change rate correcting amount Rbu decreases as the charging rate SOC of the drive battery 5 becomes closer to full charge, and the regeneration amount increasing rate Ru decreases. In such a manner, the closer the charging rate SOC becomes to full charge, the less room for accommodating regenerated electricity. Therefore, by making the regeneration amount increasing rate Ru decrease, it is possible to make the amount of electricity generation difficult to rise, suppressing overcharge.

Note that the present invention is not limited to the embodiment described above. For example, in the above embodiment, when the DOWN switch 14 is operated, the change rate correcting amounts Rvd, Rsd, and Rbd are constant. However, the change rate correcting amounts may be changed based on the vehicle speed V, the charging rate SOC, and the braking operation amount Stb, as in the case where the UP switch 13 is operated.

In the above embodiment, the regeneration amount change rate is corrected by making the addition to the change rate correcting amount in the order of the vehicle speed V, the charging rate SOC, and the braking operation amount Stb. However, the order of the corrections according to these three conditions may be changed, or the corrections may be performed collectively. In addition, the regeneration amount change rate may be corrected by reading a change rate correction coefficient based on the vehicle speed V and the like and adding the change rate correction coefficient to the regeneration amount change rate R rather than by adding the change rate correcting amounts Rv, Rs, and Rb, or may be directly adjusted by reading the regeneration amount change rate R from a map based on the vehicle speed V and the like.

The regeneration amount change rate R may be changed based on at least one of the three conditions: the vehicle speed V, the charging rate SOC, the braking operation amount Stb or may be changed using the other conditions. Alternatively, the regeneration amount change rate R may not be changed by these conditions. In the present invention, the regeneration amount change rate R may be set to be higher at least in regeneration amount increasing operation (when the UP switch 13 is operated) than in regeneration amount decreasing operation (when the DOWN switch 14 is operated).

The vehicle in the above embodiment uses the motor generator 3 including the running drive motor for the vehicle and the electric generator for regenerative electricity generation in an integrated manner. However, the vehicle may include the running drive motor and the electric generator separately or may be a hybrid vehicle including a running drive motor as well as an engine for generating electricity or running drive. The present invention is widely applicable to vehicles capable of generating regenerative electricity and capable of performing the adjustment operation of the amount of regenerative electricity generation.

What is claimed is:

1. A regeneration control device for a vehicle, comprising:
a regenerative braking device that performs regenerative braking on a revolving armature for transmitting driving force to running wheels of the vehicle at a time of decreasing a vehicle speed, so as to generate electricity;
an operation switch operated by a user of the vehicle, the operation switch performing increasing/decreasing operation on a regeneration amount in the regenerative braking device; and
a regeneration amount controller that performs increasing/decreasing control on the regeneration amount continuously in response to the increasing/decreasing operation using the operation switch, wherein
the regeneration amount controller simultaneously sets a change rate for the regeneration amount in an increasing operation of the regeneration amount and in a decreasing operation of the regeneration amount prior to operation of the operation switch, and
the change rate for regeneration amount in the increasing operation of the regeneration amount is higher than the change rate for the regeneration amount in the decreasing operation of the regeneration amount.

2. The regeneration control device for a vehicle according to claim 1, wherein
the vehicle includes a braking operation detector that detects braking operation of the vehicle, and
when the braking operation is detected, and the increasing operation is performed on the operation switch, the regeneration amount controller sets the change rate for the regeneration amount to be higher than not in braking operation.

3. The regeneration control device for a vehicle according to claim 2, wherein
the vehicle includes a vehicle speed detector that detects a running speed of the vehicle, and
when the increasing operation is performed on the operation switch, the regeneration amount controller sets the change rate for the regeneration amount to be higher as the running speed decreases.

4. The regeneration control device for a vehicle according to claim 3, wherein
the vehicle includes:
an energy storage that charges electricity generated by the regenerative braking and supplies the revolving armature with electricity for running drive; and
a charging rate state of charge detector that detects a charging rate state of charge of the energy storage, and
when the increasing operation is performed on the operation switch, an increased amount of the change rate for the regeneration amount becomes smaller as the detected charging rate state of charge approaches 100%.

5. The regeneration control device for a vehicle according to claim 4, wherein
the vehicle includes a braking amount detector that detects a braking operation amount of the vehicle, and
when the increasing operation is performed on the operation switch, the regeneration amount controller sets the change rate for the regeneration amount to be higher as the braking operation amount increases.

6. The regeneration control device for a vehicle according to claim 3, wherein
the vehicle includes a braking amount detector that detects a braking operation amount of the vehicle, and
when the increasing operation is performed on the operation switch, the regeneration amount controller sets the change rate for the regeneration amount to be higher as the braking operation amount increases.

7. The regeneration control device for a vehicle according to claim 2, wherein
the vehicle includes:
an energy storage that charges electricity generated by the regenerative braking and supplies the revolving armature with electricity for running drive; and
a charging rate state of charge detector that detects a charging rate state of charge of the energy storage, and
when the increasing operation is performed on the operation switch, an increased amount of the change rate for the regeneration amount becomes smaller as the detected charging rate state of charge approaches 100%.

8. The regeneration control device for a vehicle according to claim 7, wherein
the vehicle includes a braking amount detector that detects a braking operation amount of the vehicle, and
when the increasing operation is performed on the operation switch, the regeneration amount controller sets the change rate for the regeneration amount to be higher as the braking operation amount increases.

9. The regeneration control device for a vehicle according to claim 2, wherein
the vehicle includes a braking amount detector that detects a braking operation amount of the vehicle, and
when the increasing operation is performed on the operation switch, the regeneration amount controller sets the change rate for the regeneration amount to be higher as the braking operation amount increases.

10. The regeneration control device for a vehicle according to claim 1, wherein
the vehicle includes a vehicle speed detector that detects a running speed of the vehicle, and
when the increasing operation is performed on the operation switch, the regeneration amount controller sets the change rate for the regeneration amount to be higher as the running speed decreases.

11. The regeneration control device for a vehicle according to claim 10, wherein
the vehicle includes:
an energy storage that charges electricity generated by the regenerative braking and supplies the revolving armature with electricity for running drive; and
a charging rate state of charge detector that detects a charging rate state of charge of the energy storage, and
when the increasing operation is performed on the operation switch, an increased amount of the change rate for the regeneration amount becomes smaller as the detected charging rate state of charge approaches 100%.

12. The regeneration control device for a vehicle according to claim 11, wherein
the vehicle includes a braking amount detector that detects a braking operation amount of the vehicle, and
when the increasing operation is performed on the operation switch, the regeneration amount controller sets the change rate for the regeneration amount to be higher as the braking operation amount increases.

13. The regeneration control device for a vehicle according to claim 10, wherein
the vehicle includes a braking amount detector that detects a braking operation amount of the vehicle, and
when the increasing operation is performed on the operation switch, the regeneration amount controller sets the change rate for the regeneration amount to be higher as the braking operation amount increases.

14. The regeneration control device for a vehicle according to claim 1, wherein
the vehicle includes:
an energy storage that charges electricity generated by the regenerative braking and supplies the revolving armature with electricity for running drive; and
a charging rate state of charge detector that detects a charging rate state of charge of the energy storage, and
when the increasing operation is performed on the operation switch, an increased amount of the change rate for the regeneration amount becomes smaller as the detected charging rate state of charge approaches 100%.

15. The regeneration control device for a vehicle according to claim 14, wherein
the vehicle includes a braking amount detector that detects a braking operation amount of the vehicle, and
when the increasing operation is performed on the operation switch, the regeneration amount controller sets the change rate for the regeneration amount to be higher as the braking operation amount increases.

16. The regeneration control device for a vehicle according to claim 1, wherein
the vehicle includes a braking amount detector that detects a braking operation amount of the vehicle, and
when the increasing operation is performed on the operation switch, the regeneration amount controller sets the change rate for the regeneration amount to be higher as the braking operation amount increases.

* * * * *